Z. Wheeler.
Amalgamator.
No. 3,320. Reissued Mar. 2, 1869.
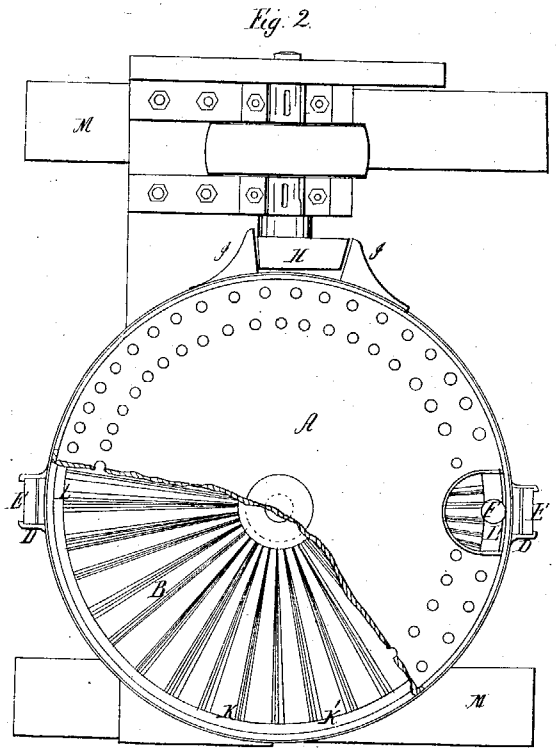
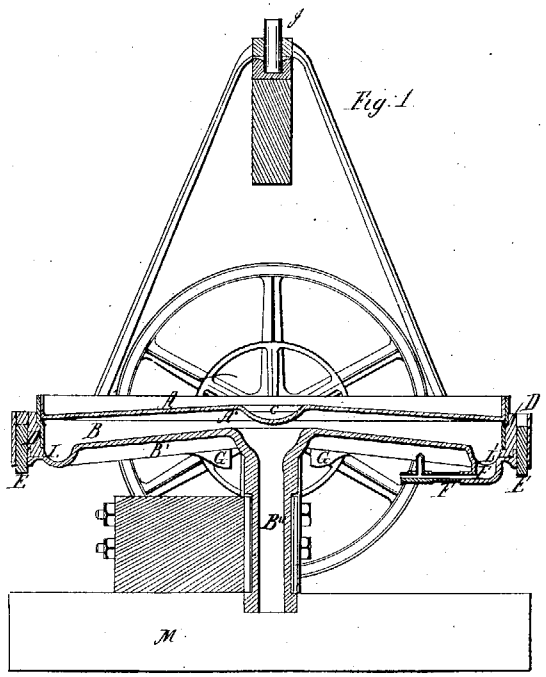
Witnesses;
Wm. M. Smith.
W. B. Ewer.
Inventor,
Zenas F. Wheeler

UNITED STATES PATENT OFFICE.

ZENAS WHEELER, OF SAN FRANCISCO, CALIFORNIA.

IMPROVED APPARATUS FOR CONCENTRATING METALLIC ORES.

Specification forming part of Letters Patent No. 44,130, dated September 6, 1864; Reissue No. 3,320, dated March 2, 1869.

*To all whom it may concern:*

Be it known that I, ZENAS WHEELER, of the city and county of San Francisco, and State of California, have invented a new and Improved Concentrator for Concentrating Metallic Ores; and I do hereby declare that the within is a full and exact description of the same, reference being had to the accompanying drawings, making a part of this specification.

My invention consists in providing a machine for concentrating metallic ores, but more especially arseniureted and sulphureted ores, that are now washed away and wasted in the process of amalgamation for want of proper machinery adapted to the purpose of separating the sand or débris without carrying with it the sulphurets, which are usually the richer portions of the ore.

It is a well-known fact that thousands of tons of sulphurets, or tailings, from quartz-mills, rich in gold and silver, are heaped up in the country awaiting the advent of some invention whereby the sand and débris can be washed away and the richer portions concentrated and shipped to points where it can be treated by processes known for extracting metal from this class of ore. It is intended that by a proper use of my invention this long-sought desideratum will be accomplished.

To enable others skilled in the art to make and use my invention, I will proceed to describe it.

The invention consists in the employment or use of a circular or other shaped pan, of any convenient size—say, about four feet in diameter—and constructed of wood, iron, or other material, and having a journal under it for holding it in position, and on which it vibrates. This journal is hollow, for the purpose of forming a discharge-pipe, B″, or outlet for water and waste matter.

The pan is about six inches deep at the outside, the bottom being two or three inches higher toward the center than it is at the periphery, with corrugations B, radiating from the center toward the circumference. These corrugations or elevations and depressions in the surface of the pan-bottom cause an undulating or wave-like motion in the material that is being worked that greatly facilitates the settling of the heavy particles to the bottom.

At the edge of the pan-bottom are two or more grooves, K L K′ L′, commencing at certain points and running each way, and gradually depressing as they approach the outlet D. These grooves are for the purpose of collecting the heavy metals or heavier portions of the material and conveying them to the lowest point in the pan.

At the lowest part of these grooves is an outlet for discharging the concentrated matter or débris as fast as it accumulates in the pan. This discharge is regulated by a gate or slide, E, which can be adjusted to any required height to allow the proper amount of concentrated matter to pass out from under the waste matter in the pan.

There is also a bowl or dish, F, connected with the lowest part ~~of the~~ grooves, for collecting any mercury or amalgam that may be contained in the material which is being worked.

From the bottom of this bowl is a discharge-pipe, F′, to pass off the surplus mercury from under the pulp in the pan as fast as it accumulates. This discharge-pipe is a little inclined downward from the bowl, and has a cock or plug at the end for the purpose of drawing off the entire contents of the bowl and pipe.

Near the end of this pipe F′ is a branch pipe, rising upward to near the level of the top of the bowl and bending over to one side, and is always open for the discharge of the accumulating mercury while the machine is performing its work.

On the under side of the pan-bottom are projections G G, which come in contact with stops which are bolted to the pan-frame M, for the purpose of arresting the motion of the pan at the end of each vibration and giving it a sudden jar, which assists materially in concentrating the ores.

There are also projections I I on the edge of the pan, for the purpose of giving it the vibratory motion by means of the cam H, which revolves between them. The form of this cam is an involute, whose evolute is a circle, and is of a proper length to give the pan a motion of about ten degrees of vibration. This form of a cam gives the pan an equal velocity in every part of its vibrations, causing it to start and stop so sudden as to prevent the sand from packing on the bottom of the pan.

Attached to the sides of the pan, and near the top, is a convex disk or screen-plate, made of iron, copper, or other material, the upper surface of which is amalgamated, for the purpose of collecting any amalgam or mercury which may be contained in the ore.

At the center of this screen-plate is a circular bowl or disk for the purpose of equalizing the flow of matter over the surface of the plate A. This plate is perforated with small holes near the lower part or outside edge, to let the water and ore pass down through into the concentrating-pan below it, and also serving as a screen or strainer, to prevent any large substance from getting into the pan which might obstruct the discharge pipe or opening.

The frame on which the pan stands can be made of square timber twelve or fourteen inches in diameter, of the proper length to accommodate the pan and cam-shaft. This timber rests on two transverse pieces about eight inches square, one placed near each end, to which it is fastened. There are two bearings fastened to the timber for holding the cam-shaft in place. There are also two stops bolted to the side of this timber, for the projections G G to strike against, and to arrest the motion of the pan at each vibration just at the time the cam leaves it.

The pan and its contents are suspended by rods or chains, which are supported by some bearing, I′, over the center of the pan, and which holds it in a horizontal position. By this means the pan runs with but very little friction on the journal.

Each letter of reference denotes the corresponding parts in each figure.

A is a sectional view of the amalgamated circular screen-plate or disk, in the center of which is the bowl for regulating the flow of the matter to all parts of the circumference of the pan. The edge or lowest part of this plate is perforated with small holes.

B represents the corrugated surface of the pan; B′, the inclined grooves at the side of the pan; B″, the outlet through the journal of the pan.

C is the bowl in the center of the screen-plate, with a piece of hard metal to prevent its wearing out.

D D is an opening for the discharge of the heavier matter as concentrated. This opening may be of any desired size or shape in or through the side or bottom of the pan, and may be employed for discharging the material directly from the machine, or into any compartment or fixtures of the machine.

E E is the slide, gate, or stopper to regulate the discharge of the concentrated matter from the pan.

F′ is the discharge-pipe for the mercury.

G G are lugs or steps on the bottom of the pan.

H is the cam and the shafts for vibrating the pan.

K L and K′ L′ are inclined grooves for gathering the concentrated matter into the outlet or discharge-orifice D.

M M is the frame on which the concentrating-pan is supported, also the cam-shaft and driving-pulley.

I′ is the rod on which the pan is suspended by some bearing over the center of it.

The operation of this machine is as follows: The bowl F and pipe F′, at the lowest part of the grooves, should be filled with mercury until it runs out of the open end of the upright bent branch pipe. I then set the pan in motion and admit a stream of water and material to be treated into the bowl in the screen-plate, and it will flow evenly over the surface of the amalgamated disk down through the small holes into the pan below, when the heavier particles will settle and be collected by the grooves K L K′ L′ and pass out at the opening D, while the surplus water and débris pass up the inclined corrugated bottom and are discharged through the journal of the pan B″

E E, the slide-gates, must be adjusted so as to let any desired amount of concentrated matter pass out. This is done by raising or lowering them.

The speed of the vibrations of the pan must be quick enough to prevent the material to be worked from packing.

Having thus described my invention, I do not claim, broadly, a vibrating disk or pan; but

I do claim—

1. The arrangement and combination of the corrugated surface B with a vibratory or oscillating pan or concentrator.

2. The inclined grooves K L and K′ L′, or their equivalent, in combination with a vibratory or oscillatory pan or concentrator.

3. The opening D, in combination with a vibratory or oscillating pan or concentrator.

4. The bowl F and tube F′, or either of them, in combination with a vibratory or oscillating pan or concentrator, substantially as and for the purposes herein specified.

ZENAS WHEELER.

Witnesses:
OTIS V. SAWYER,
JAS. COGAN.